June 10, 1930.  M. J. TRUMBLE  1,762,432
ABSORPTION TRAP
Filed Jan. 3, 1928
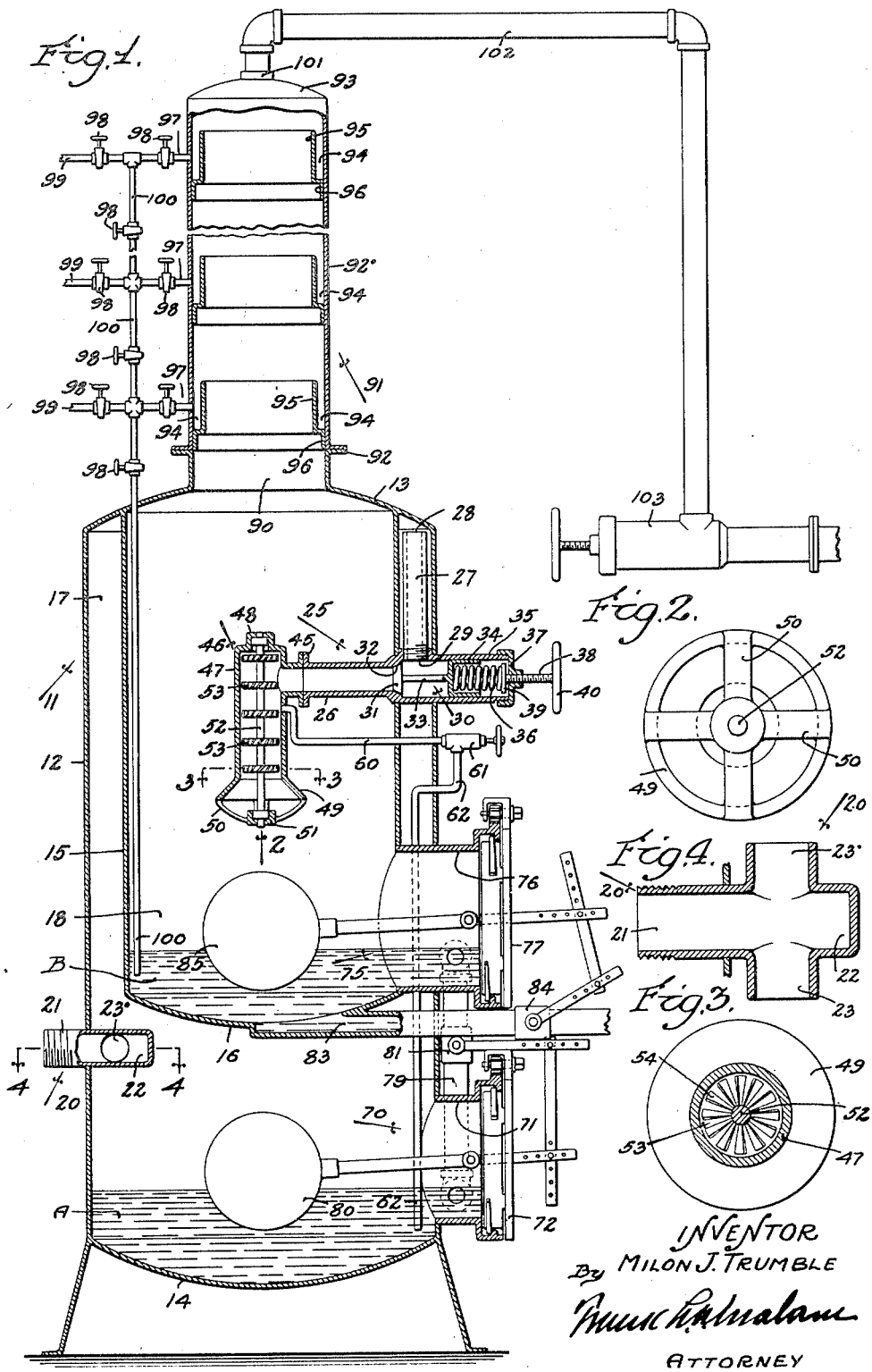
INVENTOR
By MILON J. TRUMBLE
ATTORNEY Patented June 10, 1930

1,762,432

UNITED STATES PATENT OFFICE

MILON J. TRUMBLE, OF ALHAMBRA, CALIFORNIA

ABSORPTION TRAP

Application filed January 3, 1928. Serial No. 244,247.

My invention relates to a type of apparatus commonly known as a gas trap, such as is used in connection with oil wells, and is more particularly a trap which is designed to absorb through the medium of crude oil a part of the casing head gasoline contained in the gas coming from the well and in which a part of the gasoline vapors are condensed by a drop in temperature effected by the release of pressure from the mentioned gas. In traps of this kind as commonly constructed and used, the gas coming from the well is merely separated from the oil and no attempt is made to reabsorb or recondense any of the the light constituents into the crude petroleum before the same is refined. Inasmuch as the mentioned gas coming from the trap must be put through a gasoline extraction process in which the natural or casing head gasoline must be removed, and since the removal of the gasoline and the refinement of the oil is frequently carried out by others than the producer, it is a desirable feature for the most economical refinement of the petroleum to obtain from the trap crude petroleum having the greatest possible gasoline content.

It is an object of my invention to produce an oil trap of the type described, in which the gas and the oil are separately released from well pressure in a common chamber and in which a part of the crude oil is intimately mixed with the gas and permitted to fall in a spray through the vapors escaping from the remainder of the oil. The mentioned release of pressure from the gas has a cooling effect which causes condensation of a part of the heavier vapors and aids in the mentioned absorption. The spray of crude oil falling through the vapors which escape from the main body of crude oil after the pressure has been released therefrom tends to carry the major portion of the gasoline constituents contained in these vapors back into the oil.

It is a further object of my invention to provide a trap of the type described with means for fractionating or condensing the more volatile liquid constituents and with further means whereby I may optionally remove the condensed fractions independently or may return the same collectively to the crude oil in the trap.

The general construction of the trap wherein the two above mentioned objects are accomplished comprises a high pressure chamber into which the mixture of oil and gas coming from the well is introduced and a low pressure chamber into which gas and oil are independently introduced from the mentioned high pressure chamber.

The absorption of the casing head gasoline and the production of the mentioned spray by the crude oil is effected in a novel type of an atomizing device in which a part of the oil is atomized and thoroughly admixed with gas. The fractionation is carried out in a so called fractionating column mounted above the low pressure chamber and comprising a tubular member having a substantially unobstructed opening therethrough, the inner walls of which are provided with a plurality of annular troughs which receive the condensate collecting on the walls of the chamber. The troughs are further provided with outlet openings and means whereby the condensate may be independently collected from each of said openings or collectively returned to the bottom of the inner chamber.

Other objects and advantages of my invention, including means for governing the flow of fluid therethrough and means for governing the pressure therein, will be better understood from the following description of an illustrative embodiment of same as shown in the accompanying drawings in which—

Fig. 1 is a sectional elevation showing a type of trap embodying my invention.

Fig. 2 is an inverted plan view of the atomizing chamber substantially as indicated by the arrow 2 in Fig. 1.

Fig. 3 is a sectional view of the atomizing chamber along the line 3—3 in Fig. 1, and Fig. 4 is a sectional view of a preferred type of inlet, taken along the line 4—4 of Fig. 1.

More particularly describing my invention as herein illustrated, the numeral 11 indicates an absorption trap having an outer shell 12 provided with a top 13 and bottom 14. Numeral 15 indicates an inner shell which is upwardly mounted in the outer shell 12 and has a bottom 16 positioned substantially above the bottom 14 of the outer shell. The inner shell 15 is mounted in the outer shell 12 in such a manner as to form what I may term an outer or high pressure chamber 17 and an inner or low pressure chamber 18. The outer shell 12 is provided with a gas-oil inlet 20 which comprises a substantially horizontal pipe 21 having a closed end 22, and provided with oppositely disposed outlet openings 23, 23′ in the periphery. The construction of this oil-gas inlet having the extending closed projection 22 is adapted to give a cushioning effect to the mixture which is entering the trap and tends to have an initial separating action upon the oil and the gas.

For the purpose of conducting the gas from the outer chamber 17 to the inner chamber 18, I provide what I may term a gas-inlet organization generally indicated at 25. This organization comprises a substantially horizontal pipe 26 which communicates with an outer vertical pipe 27. The vertical pipe 27 has an inlet opening 28 in the upper portion of the outer chamber 17 and an outlet opening 29 in a pressure regulating valve 30 which is mounted in the horizontal pipe 26. The regulating valve 30 may be of any preferred type, but the one illustrated which I find particularly desirable is a new type of valve shown in my copending application, Serial No. 258,868 filed March 3, 1928, and comprises a valve 31 resting upon a seat 32 and provided with a valve stem 33. The valve stem 33 is mounted upon a piston 34, which operates in a cylinder 35 and the operation of which is actuated by a spring 36. The outer end of the cylinder 35 is adapted to receive a cover plate 37 through which a screw 38 extends, having a plate 39 on the inner end thereof which plate rests upon the spring 36 and is adapted through the actuation of the screw to give any desired pressure adjustment to the valve. The outer end of the screw 38 is shown as being provided with a handle 40. Mounted on the inner outlet end 45 of the horizontal pipe 26, I provide what I may term an atomizing member 46. The atomizer comprises a downwardly extending tubular member 47 having an upper cap 48 and a lower flared outlet opening 49. The outlet opening 49 is provided with bearing support straps 50 which support a bearing 51. A rotatable shaft 52 is mounted centrally in the tubular member 46 between the lower bearing 51 and the upper bearing cap 48 and is provided with a series of circular vane members 53. The vane members 53 consist of a plurality of blades 54 which are so arranged as to be rotated by the gas entering the inlet organization 25 under pressure from the high pressure chamber 17.

For the purpose of delivering a part of the crude oil from the high pressure chamber 17 to the atomizing organization 46, I provide the atomizing tubular member 47 with what I may term an auxiliary oil inlet pipe 60. This pipe is shown as entering the tubular member immediately below the horizontal gas pipe 26 and is outwardly provided with a valve 61, which in turn is adapted to receive a pipe 62, pipe 62 extending into the bottom portion of the high pressure chamber 17.

It will be understood that the difference in pressure between the two chambers is adequate to cause a continual flow of oil through the pipe 62 and into the atomizer 46 where the rotation of the vanes 53 atomizes the oil, thereby effecting a thorough admixture of the oil and the gas forming a very great contacting surface between these two fluids. This is found to give a highly efficient absorption of the natural gasoline constituents from the gas by the oil entering the atomizer.

The outer shell 12 is provided with a manhole opening 70 which comprises an outwardly extending tubular chamber 71 and a cover member 72 and the inner shell 15 is provided with a corresponding manhole opening 75 comprising an outwardly extending tubular member 76 and a cover member 77. The cover members 72 and 77 may be of any preferred type, the type as illustrated being described and claimed in my former Patent No. 1,653,137, issued on December 20, 1927.

The tubular manhole openings 71 and 76 are provided with an interconnecting pipe 79 for the purpose of permitting the passage of oil from the bottom of the outer chamber 17 to the bottom of the inner chamber 18. The outer chamber 17 is provided with a float 80 which actuates a valve 81 in the mentioned interconnecting pipe 79 and tends to maintain a constant level of oil in the outer chamber 17. The bottom 16 of the inner chamber 18 is provided with an oil outlet pipe 83 having a float controlled valve 84 therein. The valve 84 is controlled by a float 85 mounted in the inner chamber 18 by means of which any desired level may be maintained in the mentioned inner chamber.

It will be noted in the type of my invention as illustrated that the top member 13 of the outer shell is common to both the inner and the outer chambers 17 and 18. The top 13 is centrally provided with a passage 90 which forms an opening into the inner chamber 18. A fractionating column 91 is mounted above the passage 90 being connected thereto by any desired type of connection such as the flanged fitting indicated at 92.

The fractionating column 91 comprises an outer shell 92′ and a top 93. The inner surface of the shell 92′ is provided with a plurality of annular fractionating troughs 94. The troughs 94 are formed by mounting tubular segments 95 downwardly provided with outwardly extending flange members 96. The flange members 96 are secured to the inner surface of the tubular member 95 in any preferred manner, such as welding. Each of the fractionating troughs indicated at 94 is provided with an outlet pipe 97. These pipes 97 are provided with a plurality of valves indicated at 98, whereby the condensate from troughs 94 may be independently withdrawn through pipes 99 or may be by-passed into a pipe 100 which extends to the bottom of the inner chamber 18. The top 93 of the fractionating column is provided with a gas outlet opening 101 which communicates with a gas pipe 102. The pipe 102 is optionally provided with a pressure regulating valve 103 for the purpose of controlling the gas pressure in the inner chamber.

In the operation of my invention it will be understood that the gas and oil mixture coming from the well enters the outer chamber 17 at well casing pressure which may be several hundred pounds. The mixture is partially broken in the entrance nipple 20, the oil dropping into the bottom of the chamber as indicated at A, and the gas rising to the top of the chamber and into the atomizer through the pipe 27 as heretofore explained. The expansion of the gas resulting from the drop in pressure between the high pressure and the low pressure chambers causes a drop in temperature which tends to condense a part of the less volatile constituents and to aid the crude oil entering through pipe 60 in the absorption of these less volatile substances.

It will be understood that the crude oil contained in the high pressure chamber which does not enter the low pressure chamber through pipe 60 is forced from the bottom portion "A" of the high pressure chamber to the bottom of the low pressure chamber through the pipe 79 by the difference in pressure between the two chambers and occupies a portion of the low pressure chamber indicated at "B". Due to the difference in pressure on the oil in the two chambers, any entrained gas in the oil will escape in the low pressure chamber and will carry with it a part of the casing head gasoline constituents. The spray of crude oil, falling from the atomizer 45, reabsorbs these gasoline constituents and returns them to the main body of crude oil.

It will be apparent that the gas coming from the described type of trap, due to the combined condensing and absorbing action, is much dryer, and the oil contains a much greater quantity of gasoline constituents than that obtained from any of the commonly known gas-oil separating traps.

While I have herein described and illustrated one preferred embodiment of my invention, it will be understood that various modifications of the same may be readily designed by those familiar with the art without in the least departing from the spirit and scope of my invention as described above and in the following claims.

I claim as my invention:

1. An absorption trap comprising: a high pressure chamber; a low pressure chamber mounted in said high pressure chamber; means for admitting a mixture of oil and gas to said high pressure chamber; means for conducting gas from the top of said high pressure chamber into said low pressure chamber; means for conducting oil from said high pressure chamber to said low pressure chamber; means for atomizing a part of said oil with the gas coming from the high pressure chamber into said low pressure chamber; and means for separately conducting said gas and oil from said low pressure chamber.

2. An absorption trap comprising: a high pressure chamber; a low pressure chamber; means for admitting a mixture of oil and gas to said high pressure chamber; means for conducting gas from said high pressure chamber to said low pressure chamber; means for conducting oil from said high pressure chamber to said low pressure chamber; means for mechanically atomizing a part of said oil in contact with said gas in said low pressure chamber; and means for separately conducting said gas and said oil from said low pressure chamber.

3. An absorption trap comprising: a high pressure chamber; a low pressure chamber; means for admitting a mixture of oil and gas to said high pressure chamber; means for conducting gas from said high pressure chamber to said low pressure chamber; means for conducting oil from said high pressure chamber to said low pressure chamber; means for mechanically atomizing a part of said oil in contact with said gas in said low pressure chamber; and means for separately conducting said gas and said oil from said low pressure chamber, said gas being effective to operate said atomizing means.

4. An absorption trap comprising: a high pressure chamber having an oil-gas inlet; a low pressure chamber mounted in said high pressure chamber; a gas passage from said high pressure chamber to said low pressure chamber; a mechanical atomizer in said gas passage; means for injecting an auxiliary stream of oil into said atomizer; means for conducting a main stream of oil from said high pressure chamber to said low pressure chamber; and outlet means for separately conducting oil and gas from said low pressure chamber.

5. An absorption trap comprising: a high pressure chamber having an oil-gas inlet; a low pressure chamber mounted in said high pressure chamber; a gas passage from said high pressure chamber to said low pressure chamber; a mechanical atomizer in said gas passage; means for injecting an auxiliary stream of oil into said atomizer; means for conducting a main stream of oil from said high pressure chamber to said low pressure chamber; and means for regulating the flow of gas between said chambers.

6. An absorption trap comprising: a high pressure chamber having an oil-gas inlet; a low pressure chamber mounted in said high pressure chamber; a gas passage from said high pressure chamber to said low pressure chamber; a mechanical atomizer in said gas passage; means for injecting an auxiliary stream of oil into said atomizer; means for conducting a main stream of oil from said high pressure chamber to said low pressure chamber; and means governing the flow of oil between said chambers.

7. An absorption trap comprising: a high pressure chamber having an oil-gas inlet; a low pressure chamber mounted in said high pressure chamber; means forming a gas passage from said high pressure chamber to said low pressure chamber; atomizing means in said gas passage; means for injecting an auxiliary stream of oil into said atomizer; means for conducting a main stream of oil from said high pressure chamber to said low pressure chamber; outlet means for separately conducting gas and oil from said low pressure chamber; a fractionating column associated with said low pressure chamber; and means for independently recovering liquid fractions condensed in said fractionating column.

8. An absorption trap comprising: an outer shell; an inner shell upwardly mounted in said outer shell having a bottom substantially above the bottom of said outer shell and forming an inner and an outer chamber; a liquid-gas inlet pipe extending into said outer chamber; a gas passage from said outer chamber to said inner chamber comprising a tubular member having an inlet in the top of said outer chamber and an outlet within said inner chamber, said outlet being provided with a downwardly extending tubular atomizing passage having a plurality of rotatable vanes therein; an auxiliary liquid line extending from said atomizing passage to the bottom of said outer chamber; a main liquid line connecting said inner chamber with said outer chamber; and a liquid outlet pipe from the bottom of said inner chamber, said inner chamber having a gas outlet from the top thereof.

9. An absorption trap comprising: a high pressure chamber; a low pressure chamber mounted in said high pressure chamber; means for admitting an oil-gas mixture to said high pressure chamber; means for admitting gas from said high pressure chamber to said low pressure chamber; means in said low pressure chamber for bringing said gas into intimate contact with oil from said high pressure chamber; means for conducting oil from said high pressure chamber to said low pressure chamber, said low pressure chamber having an oil outlet; and gas outlet means from said inner chamber, including a substantially vertical tubular column having a plurality of annular troughs therein adapted to receive a condensate collecting on the inner surface of said column.

10. An absorption trap comprising: a high pressure chamber; a low pressure chamber; means for admitting an oil-gas mixture to said high pressure chamber; means for admitting gas from said high pressure chamber to said low pressure chamber; means in said low pressure chamber for bringing said gas into intimate contact with oil from said high pressure chamber; means for conducting oil from said high pressure chamber to said low pressure chamber, said low pressure chamber having an oil outlet; and gas outlet means from said low pressure chamber comprising a substantially vertical tubular column having an annular trough therein adapted to receive a condensate collecting on the inner surface of said column, and means for delivering said condensate into said low pressure chamber.

In testimony whereof I have hereunto set my hand at Los Angeles, California, this 23rd day of December, 1927.

MILON J. TRUMBLE.